United States Patent
Ekanayake et al.

(10) Patent No.: US 7,043,227 B2
(45) Date of Patent: May 9, 2006

(54) DATA CONVERSION IN TELECOMMUNICATION SYSTEMS

(75) Inventors: Alec Mahendra Bandara Ekanayake, Wellington (NZ); Tuan Irfarn Hassim, Wellington (NZ); Yee Chung Ng, Lower Hutt (NZ); Fred Litz, Wellington (NZ); Stephen Bernard O'Shannessy, Wellington (NZ); Kankanige Anuruddha Padmanath Perera, Wellington (NZ); Rob Dorsman, Raumati South (NZ); Hemantha Srilan Akmeemana, Wellington (NZ)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 09/965,938

(22) Filed: Sep. 27, 2001

(65) Prior Publication Data

US 2002/0045436 A1    Apr. 18, 2002

(30) Foreign Application Priority Data

Sep. 29, 2000    (NZ) .................................... 507245

(51) Int. Cl.
*H04M 11/00* (2006.01)
*H04Q 7/20* (2006.01)

(52) U.S. Cl. .................. 455/406; 455/408; 455/414.4; 455/432.2; 379/114.03; 379/121.05

(58) Field of Classification Search .......... 379/114.03, 379/126, 115.01, 121.05; 455/405, 126, 455/406, 408, 432.1, 432.2, 414.4
See application file for complete search history.

(56) References Cited

U.S. PATENT DOCUMENTS

| | | | | |
|---|---|---|---|---|
| 5,218,632 A | * | 6/1993 | Cool | ........................ 379/126 |
| 5,511,113 A | * | 4/1996 | Tasaki et al. | ......... 379/114.28 |
| 5,907,603 A | * | 5/1999 | Gallagher et al. | ......... 379/133 |
| 6,052,448 A | * | 4/2000 | Janning | ................ 379/115.01 |
| 6,134,307 A | * | 10/2000 | Brouckman et al. | ... 379/115.03 |
| 6,947,743 B1 | * | 9/2005 | Aitken et al. | ............ 455/432.2 |
| 2004/0008723 A1 | * | 1/2004 | Uchida et al. | .............. 370/466 |
| 2005/0141552 A1 | * | 6/2005 | Schwalb | .................... 370/466 |

* cited by examiner

*Primary Examiner*—Binh K. Tieu
(74) *Attorney, Agent, or Firm*—John R. Pivnichny; Dillon & Yudell LLP

(57) ABSTRACT

A method and system for receiving data from a telecommunication service provider. Validation rules for analyzing data items in a first format and population rules for converting the data items into a second format are specified. A set of data items in the first format are received by the service provider and analyzed according to the validation rules. The data items are then converted to the second format according to the population rules.

6 Claims, 6 Drawing Sheets

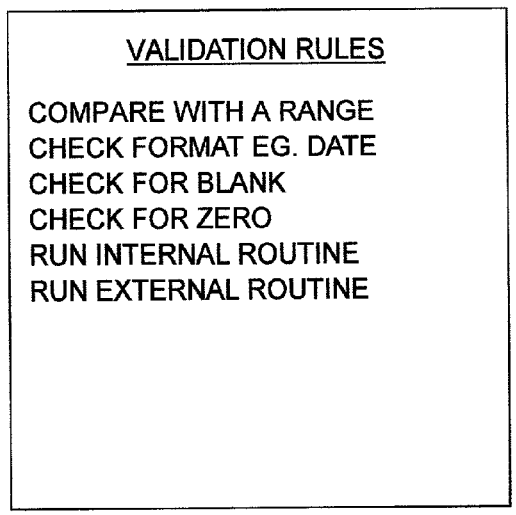

VALIDATION RULES

COMPARE WITH A RANGE
CHECK FORMAT EG. DATE
CHECK FOR BLANK
CHECK FOR ZERO
RUN INTERNAL ROUTINE
RUN EXTERNAL ROUTINE

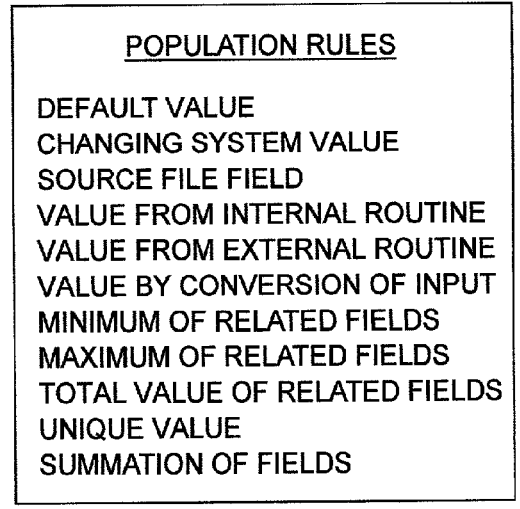

POPULATION RULES

DEFAULT VALUE
CHANGING SYSTEM VALUE
SOURCE FILE FIELD
VALUE FROM INTERNAL ROUTINE
VALUE FROM EXTERNAL ROUTINE
VALUE BY CONVERSION OF INPUT
MINIMUM OF RELATED FIELDS
MAXIMUM OF RELATED FIELDS
TOTAL VALUE OF RELATED FIELDS
UNIQUE VALUE
SUMMATION OF FIELDS

FIG. 7b

| 71 | VALIDATION RULE |
|---|---|
| 72 | METHOD |
| 73 | DATA |
| 74 | TAG V1<br>SOURCE FIELD: ABCFLD X1 |
| 75 | TAG V2<br>SOURCE FIELD: ABCFLD X2<br>SOURCE FIELD: ABCFLD X3 |
| ⋮ | |
| 76 | TAG VN<br>SOURCE FIELD: ABCFLD XN |

FIG. 8b

| | POPULATION RULE | | 81 |
|---|---|---|---|
| | METHOD | | 82 |
| | DATA | | 83 |
| 84 | TAG PS1<br>SOURCE FIELD:<br>ABCFLD Y1 | TAG PT1<br>TARGET FIELD:<br>XYZFLD Z1 | 87 |
| 85 | TAG PS2<br>SOURCE FIELD:<br>ABCFLD Y2 | TAG PT2<br>TARGET FIELD:<br>ABCFLD Z2 | 88 |
| | ⋮ | ⋮ | |
| 86 | TAG PSN'<br>SOURCE FIELD:<br>ABCFLD YN' | TAG PTN"<br>TARGET FIELD:<br>ABCFLD ZN" | 89 |

DATA CONVERSION IN TELECOMMUNICATION SYSTEMS

FIELD OF THE INVENTION

The invention relates to the conversion of subscriber call information from one data format to another data format for transfer from one telecommunication service provider to another. More particularly it relates to the conversion of call information relating to usage of a subscriber's mobile telephone in a foreign network, the converted information being used by the subscriber's home service provider to generate billing information.

BACKGROUND TO THE INVENTION

The use of mobile telephones has become widespread throughout the world. One reason for the widespread use is the advent of cellular network communication standards such as GSM which enable a subscriber to "roam", that is to operate the mobile telephone on networks in other regions and countries as well as on the subscriber's own home network.

When a subscriber makes a call while roaming, information relating to the call is passed from the service provider associated with the foreign network to the service provider of the home network. This information can then be used by the home service provider to generate the appropriate billing information. However as the format of information coming from the foreign service provider is different from that required by the home service provider a conversion of the information must take place at some point in the transfer process.

In existing systems the procedures governing the conversion of information have been "hard coded" into the application software. This has the disadvantage that any necessary change to the conversion process requires modification of the application software. Change might be required, for example, if a change in the data format occurs, or if a reciprocal agreement is arranged between the home service provider and a further foreign service provider.

Modification of the application software is an expensive and time consuming task. It would therefore be desirable to have a more flexible system which can be modified more readily as required.

SUMMARY OF THE INVENTION

It is an object of the invention to provide a method, system or computer readable medium containing code which assists the transfer of customer data from one telecommunication service provider to another telecommunication service provider.

In one aspect the present invention may be said to include in a method for receiving data from a telecommunication service provider comprising: specifying validation rules for analyzing data items in a first format, specifying population rules for converting the data items to a second format, receiving a set of data items in the first format from the service provider, analyzing the set of data items according to the validation rules, and converting the data items into the second format according to the population rules.

In another aspect the present invention may be said to include a system for receiving data from a telecommunication service provider comprising: means for specifying validation rules for analyzing data items in a first format, means for specifying population rules for converting the data items to a second format, means for receiving a set of data items in the first format from the service provider, means for analyzing the set of data items according to the validation rules, and means for converting the data items into the second format according to the population rules.

In another aspect the present invention may be said to include in a computer readable medium containing code for implementing a system which receives data from a telecommunication service provider by: specifying validation rules for analysing data items in a first format, specifying population rules for converting the data items to a second format, receiving a set of data items in the first format from the service provider, analysing the set of data items according to the validation rules, and converting the data items into the second format according to the population rules.

The invention may also broadly be said to include any alternative combination of features as described or shown in the accompanying drawings. Known equivalents of these features not expressly set out are nevertheless deemed to be included.

BRIEF DESCRIPTION OF THE DRAWINGS

Preferred embodiments of the invention will be described with respect to the accompanying drawings, of which:

FIG. 7a shows exemplary rules for validation of a target file using data from a source file, FIG. 7b shows the general structure of a validation rule which checks one or more source data fields, FIG. 8a shows exemplary rules for population of a target file using data from a source file, FIG. 8b shows the general structure of a population rule which generates one or more target data fields according to information in one or more source data fields, FIG. 9 outlines an exemplary validation and population process, and FIG. 10 outlines an exemplary process for altering the validation and population rules associated with a field.

DETAILED DESCRIPTION OF THE PREFERRED EMBODIMENTS

Figure 1:
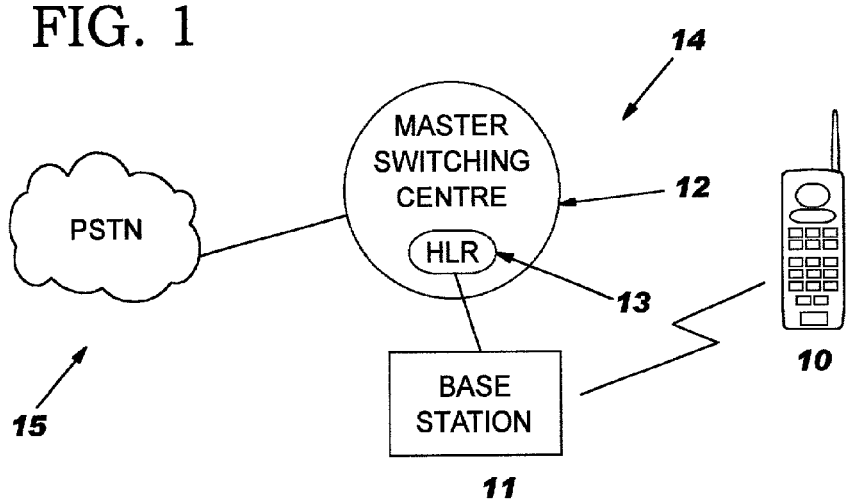
FIG. 1 schematically shows a mobile telephone device in relation to a home cellular network and a wider public network, FIG. 2 schematically shows the telephone roaming from the home network to a network in another region or country, FIG. 3 schematically indicates how usage information is received from remote networks for administration in the home network, FIG. 4 schematically shows how source data from a remote network is converted into target data for the home network.

Referring to the drawings it will be appreciated that transferring data from one telecommunication service provider to another according to the invention may be implemented in various forms. The following embodiments are given by way of example only. Details relating to the telecommunications networks themselves and the data being transferred will be known to those skilled in this area of technology and will not be discussed in detail.

FIG. 1 shows schematically a mobile cellular telephone 10 being used on its local or "home" cellular network 14. A home network 14 refers to the telecommunications network and associated services which are provided to a subscriber by a service provider with which the subscriber is registered and holds an account. The home network 14 includes a plurality of base stations 11 with which a mobile unit 10 can make radio contact, and a master switching center 12 for connectivity of the cellular network with a public switched telephone network 15 (PSTN). The mobile unit 10 makes regular contact with the closest base station 11 to register its position in the network which is subsequently stored in a home location register 13 (HLR). The HLR 13 further includes information relating the services available to a customer and other relevant subscriber information.

Figure 2:
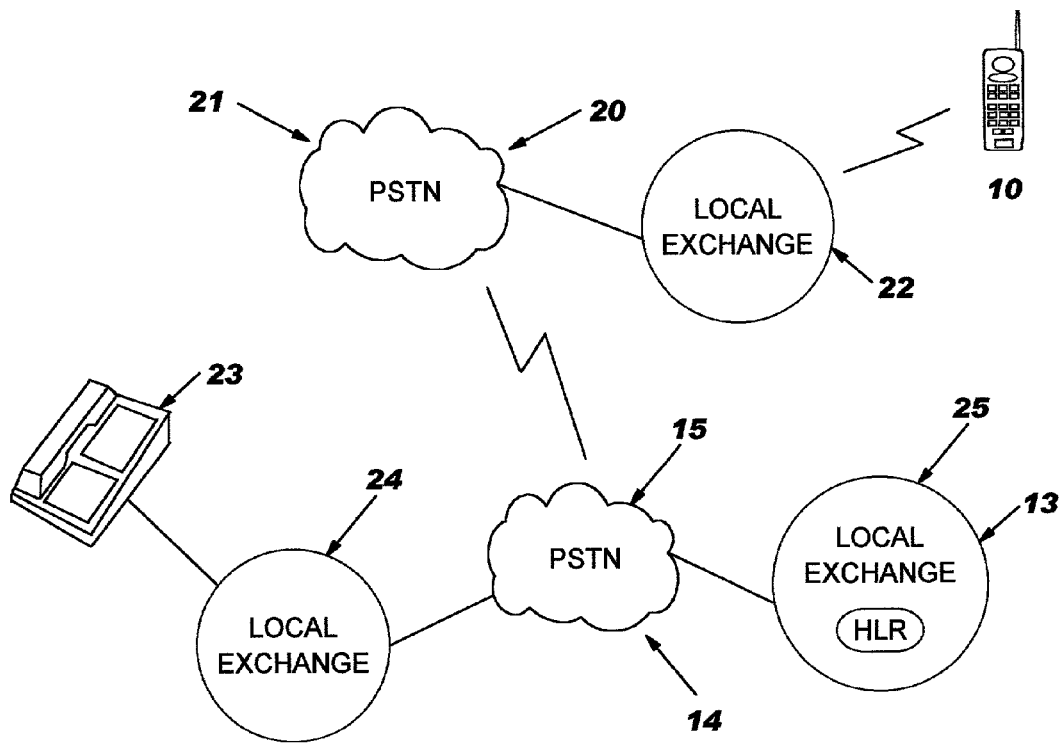

FIG. 2 shows schematically a mobile telephone 10 being used on a remote or "foreign" cellular network. A foreign network refers a telecommunications network and associated services which are provided to a user by a service provider other than that with which the user is registered. A reciprocal agreement between the foreign service provider and home service provider enables the services of both to be used by customers of either service provider. It will be appreciated that the use of the term foreign network is used to refer to a network in another country, region or even the same region as the home network 14. The foreign 20 and home 14 networks are interconnected in a manner which will be well known in the art, for example through PSTNs 21, 15.

While roaming on the foreign network 20 the mobile unit 10 makes regular contact with the closest base station or local exchange 22 of the foreign network to register its position. During a telephone call the mobile unit 10 makes radio contact with the closest local exchange 22 of the foreign network 20 and sends signals relating to the call which are then routed to the destination telecommunications terminal, for example the landline telephone 23 connected to a local exchange 24. Call information is sent to the home service provider which in turn can be used to generate account information, for example monthly customer bills. Generally the information generated by the foreign service provider relating to the roaming subscriber terminal 10 is in a different format than that required by the home service provider.

Figure 3:
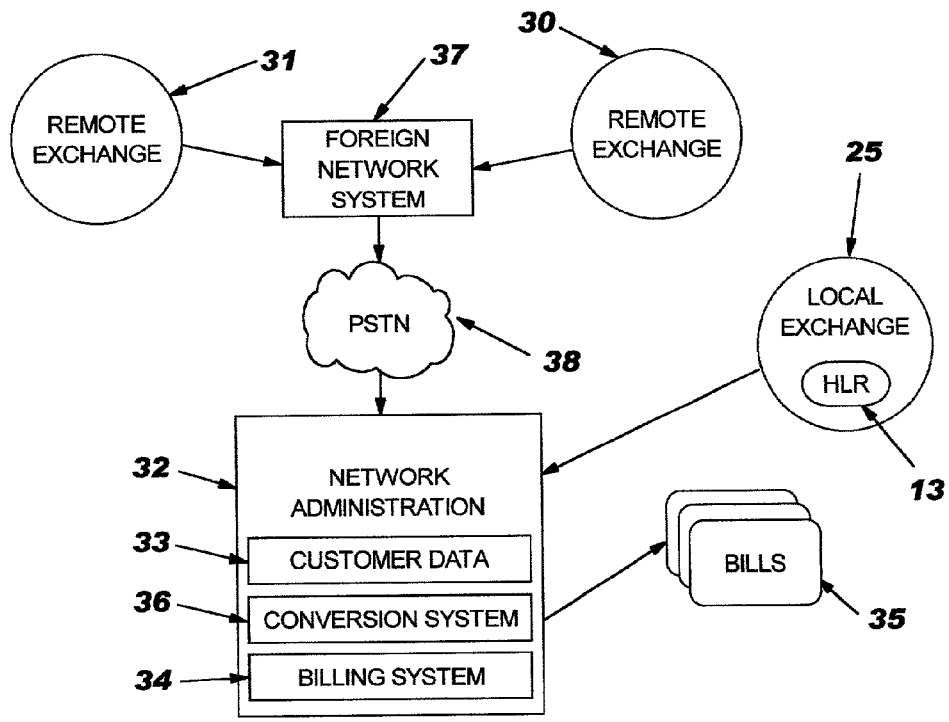

FIG. 3 shows schematically a system for enabling conversion of roaming subscriber information generated by a foreign service provider to a suitable format for the subscriber's home service provider. Each remote exchange 30, 31 belongs to a foreign network 20 which the roaming subscriber terminal 10 may use and the local exchange 25 belongs to the subscriber's home network 14. The home service provider includes a network administration 32 subsystem which facilitates storage of customer data 33 and generation of customer bills 35 via a billing system 34. The administration subsystem 32 also includes a conversion system 36 for converting information received in a format conforming to the foreign service provider requirements into a format conforming to home service provider requirements.

Information relating to roaming subscribers is sent from the participating remote exchanges 30, 31 as required to foreign network operator system 37 and relayed via PSTN 38 to the network administration subsystem 32 for conversion, storage and subsequent bill generation. The administration subsystem 32 may be implemented using any suitable computer system which includes data reading devices, such as hard drives, magnetic tape drives, CDROM drives and the like as required. Computer code for implementing the system which is contained on computer readable media can be loaded into the system via the appropriate data reading devices. It will be appreciated that while the system has been described with reference to one foreign service provider such a system can be generalized to handling roaming subscriber information generated by more than one foreign service provider.

Figure 4:
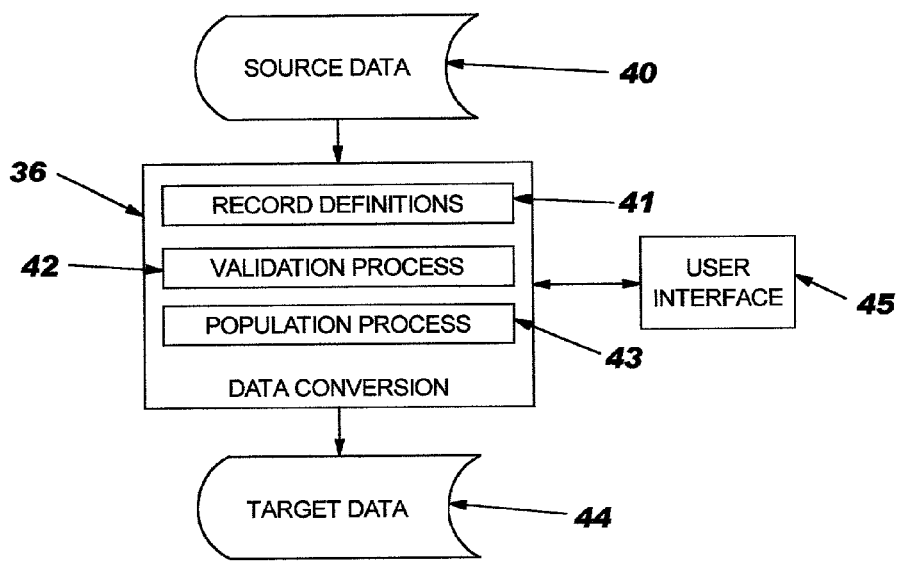

FIG. 4 shows the conversion system in more detail. Source data 40 from the foreign service provider is transferred to the conversion system 36. The data 40, which is in a foreign service provider format, relates to many roaming subscribers and can be transferred in bulk at regular intervals as required. The conversion system 36 has a file of soft coded record definitions 41 which are defined by the home service provider and relate to the format of the source data 40. Preferably the source data 40 in the first format will be serialised into a data stream for transferral and the record definitions will correlate the data stream to the first format. The conversion system 36 also implements a validation process 42 which checks that all incoming data conforms, or is compatible, with the record definitions 41 for the incoming source data. A population process 43 then converts the incoming data 40 into target data 44 which conforms to a format required for storage and use by the home service provider.

Both the validation process 42 and the population process 43 utilize predefined rules which are associated or attached to fields in the record definitions 41 as specified by the home service provider. The processes 42, 43 apply the rules to the data items in the rules' associated fields. The association of the rules with particular fields is soft coded to enable the home service provider to alter the associations as required. The users of the conversion system 36 can change the association of validation and population rules by way of a user interface 45 in accordance with home service provider requirements. A typical user interface 45 might include a computer terminal running configuration software which is linked to the conversion system 36. The record definitions, validation rule associations and population rule associations are soft coded which enables alteration by the home service provider without the need for revising the hard coded software.

Figure 5:
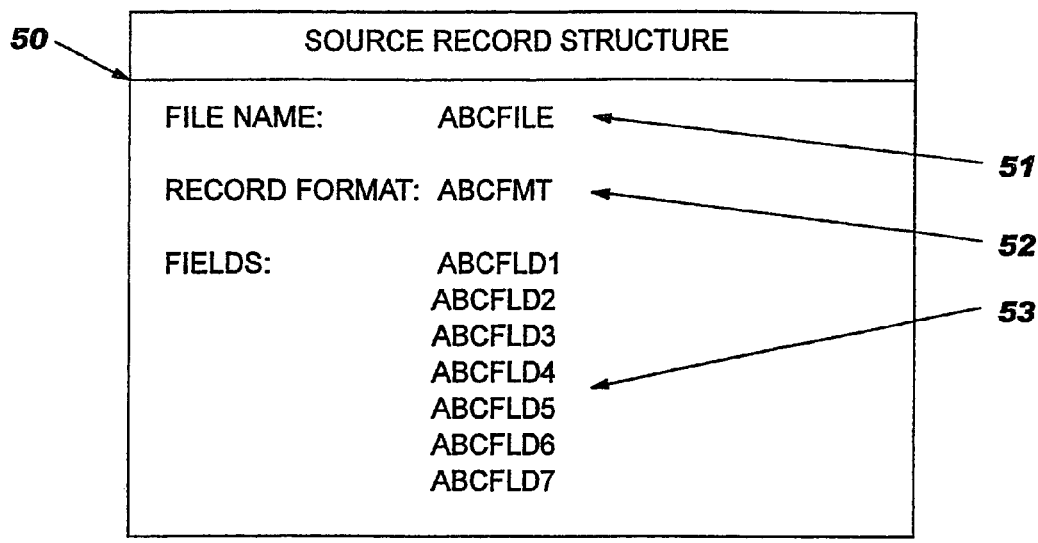
FIG. 5 is an exemplary source file record structure for interchange of information between the networks.
Figure 6:
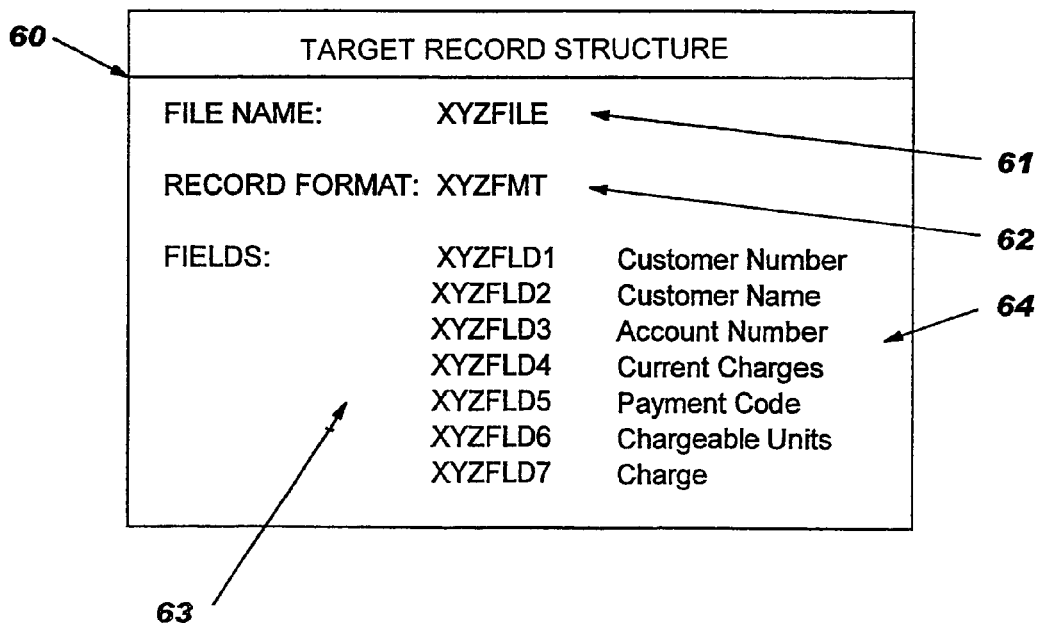
FIG. 6 is an exemplary target file record structure for interchange of information between the networks.

FIGS. 5 and 6 show preferred source data and target data record structure definitions 50, 60 respectively. The record structures 50, 60 belong to a file of multiple record structures, each structure containing a filename 51, 61, record format identifier 52, 62 and a set of fields 53, 63. The fields 53, 63 relate to data items in the source and target data streams, are defined by the home service provider and include attributes such as "Field Type", "Length in Bytes", "Description", "Buffer Position" and the like. The field descriptions 64 for the target record structure 60 are visible in FIG. 6. The fields 53, 63 are defined by way of a field definition function provided by the user interface 45 and the sequence in which the fields appear in the structure 50, 60 is specified by a population sequence. The field definition function also calculates the buffer positions of each field 53, 63 within the respective record structures which is then stored.

FIG. 7a shows some possible validation rules 70 which could be utilized in a preferred embodiment of the invention. Preferably the most frequently used validation rules in a data transfer or interchange are identified at design time and integrated into the hard coded application software of the conversion system 36. The integrated validation rules or methods can be selected by the home service provider using the user interface 45 and attached or associated with one or more fields 53 defined in the source data record structure 50. One such rule may be a "check format" rule which analyses a data item from the source data to ensure that the data item conforms to the format and data type of the corresponding field in the data record structure.

For example, a date validation rule could check that a date conforms to the date field format such as Year/Month/Day. Other validations such as those which check for zeros, blanks or the value range of a data item in a field could also be included. More complex validation rules can be grouped into either external or internal procedures, routines or programs. A selected procedure name can then be attached to a field or fields to implement the validation procedure on that field. It will be appreciated that the above validation rules are just examples of some of preferred validations which could be utilized. A variety of other validation rules will be envisaged by those skilled in the art once taught the invention. New validation rules may be utilized as they are devised. These can be coded as a standalone program and then attached against a field or fields as required.

FIG. 7b shows the general structure of a generic validation rule 71. The rule includes a method 72 for operating on data 73. The validation rule is attached or associated to one or more fields 53 defined in the source data record 50 on which it is to operate by way of tags 74–76. For example the rule of FIG. 7b has a TAG V1 74 for source data field ABCFLD X1, a TAG V2 75 for field ABCFLD X2 and ABCFLD X3 and so on. A rule can be tagged to as many fields as necessary and similarly several rules can be attached to a single field as necessary. It will also be appreciated that a validation rule tag, for example TAG V2 75 may specify more than one associated field where the rule is defined to operate on more than one field. This might be where a rule needs to compare two fields to validate the data. The data 73 comprises all the data items form the source data corresponding to the fields to which the validation rule is tagged.

FIG. 8a shows some possible population rules 80 which could be utilised in a preferred embodiment of the invention. Preferably the most frequently used population rules in a data transfer are identified and integrated into the hard coded application software of the conversion system 36. The population rules or methods can be selected by the home service provider using the user interface 45 and attached or associated with one or more fields 53, 63 defined in the source data record structure 50 and target data record structure 60. The population rule takes a data item from a source data field and converts it to a format suitable for populating the corresponding target data field. For example a commonly used population rule is that the target data field is filled directly with data from the corresponding source data field without any conversion taking place. A number of other population rules could be implemented, for example, summing two or more source fields to populate a target field, populating the target field with a default value, or populating a target field with the result from an internal or external program or routine. A variety of other population rules may be envisaged by those skilled in this area of technology. If a new population rule is required in the future, the rule could be coded and integrated in the existing hard coded population engine. The new rule could then be utilized by altering a soft coded field to associate the field with the new rule.

FIG. 8b shows the general structure of a generic population rule 81. The rule includes a method 82 for operating on data 83. The population rule is attached to or associated with one or more fields 53 defined in the source data record 50 on which it is to operate by way of tags 84–86. It is also attached to one or more fields 63 defined in the target data record 60 by way of tags 87–89. For example the rule of FIG. 8b has a TAG PS1 84 for source data field ABCFLD Y1, a TAG PS2 85 for field ABCFLD Y2, a TAG PT1 87 for target field XYZFLD Z1, a TAG PT2 88 for target field XYZFLD Z2 and so on. A rule can be tagged to as many fields as necessary. It will also be appreciated that a population rule tag may specify more than one associated field where the rule is defined to operate on more than one field. The data 83 comprises all the data items form the source data corresponding to the fields to which the population rule is tagged.

Figure 9:
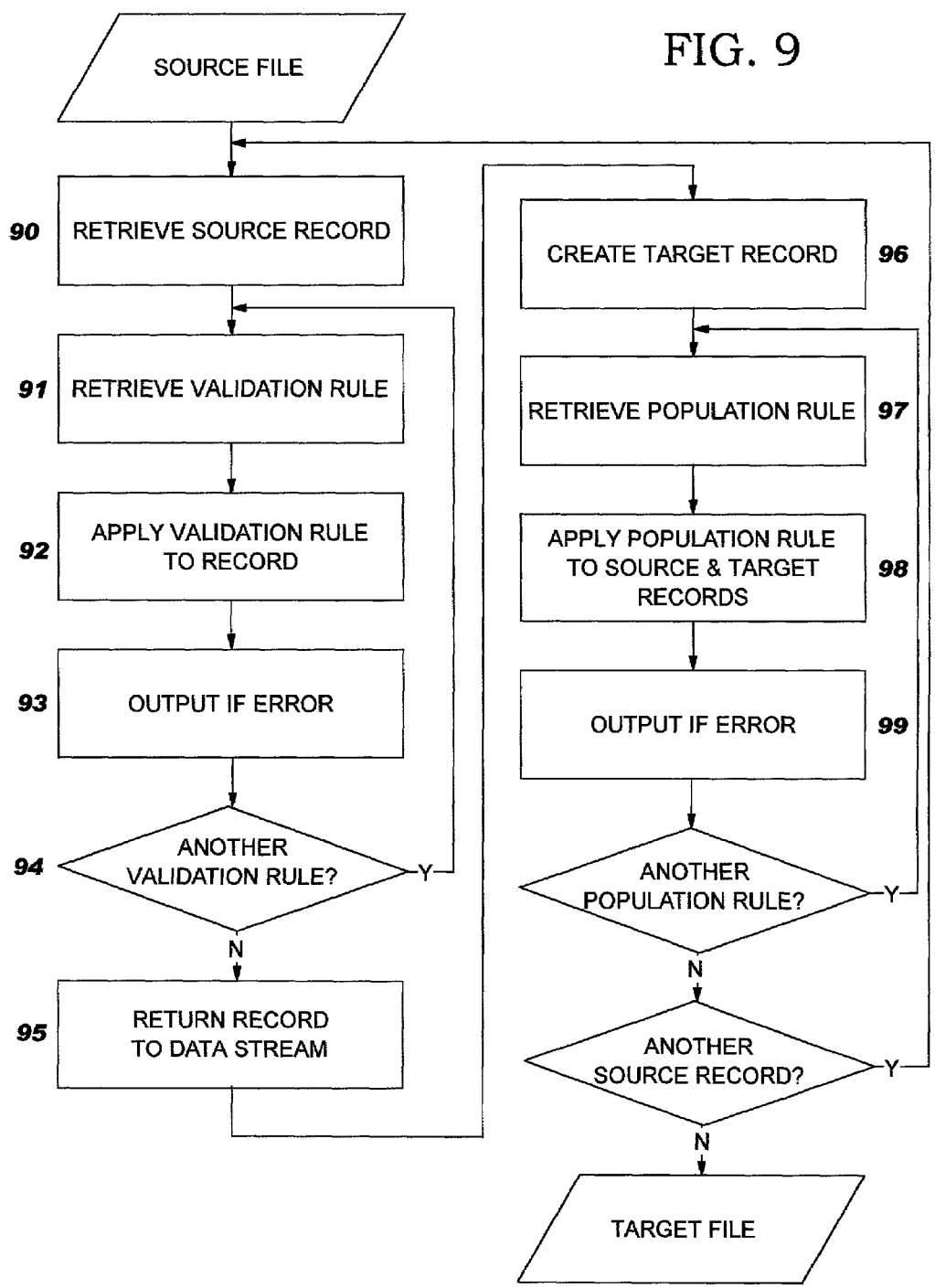

FIG. 9 outlines a preferred method of carrying out the conversion process. A record is retrieved 90 from a source file containing data received from a foreign service provider, the data relating to roaming subscriber's telephone usage on the foreign service provider's network. Preferably the record is retrieved as a stream of data and will be in a format corresponding to the source data record structure 50. The validation rules defined for the system are retrieved one by one. As each rule is retrieved 91 the validation process applies 92 the rule to those fields of the record which are associated with the retrieved validation rule. If the data item in the field does not conform to the validation requirements then an error is output 93. Otherwise the field is validated and the system retrieves the next validation rule and applies it to the associated fields in the record. Once all the validation records have been retrieved 94 and applied as required the validated record is returned to the data stream 95.

A blank target record is then created 96 ready for population by converted data. The record is structured according to the target file record structure 60. The data stream is passed to the population process or engine in which population rules are retrieved one by one 97. As each population rule is retrieved 97 the population process applies 98 the rule to those source and target fields of the source and target record structures which are associated with the retrieved population rule. If some error occurs in the population process an error message is output 99. Otherwise the target field is populated with the converted source data, another population rule is retrieved 97 and the process begins again. Once all the population rules have been retrieved and the target record has been populated; another record can be retrieved 90. The target file is complete once all source file records have been retrieved and processed.

Figure 10:
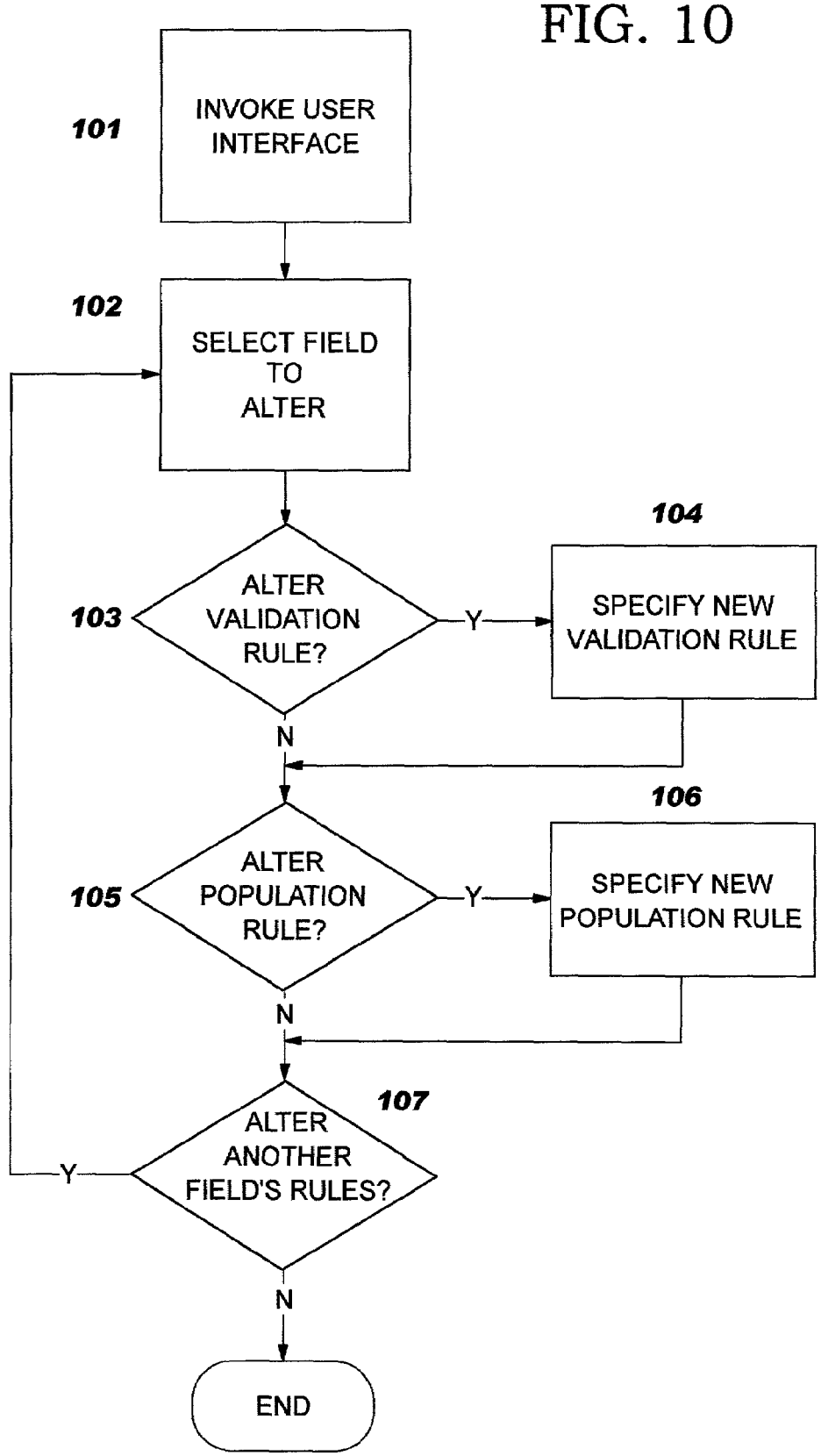

FIG. 10 shows a preferred embodiment of the process for specifying or altering the soft coded record structures. A user of the system invokes the user interface 101 and then selects a field which requires a validation rule and/or population to be specified. The user may select either a field from a source data record definition 50 or target data record definition 60. The user is presented with the option 103 of specifying a validation rule for the selected field 104 and then is presented with the option 105 of specifying 106 the field's population rule. It is possible that where appropriate more than one validation rule might be specified or associated with each field. Once all rules have been specified for a selected field the user may select 102 another field to configure or else end the configuration process.

The alteration process enables the home service provider to configure the system for incoming data from one or more foreign service providers. The soft coded nature of the process enables the system to be reconfigured for a new foreign service provider which may initiate a reciprocal usage agreement with the home service provider without the need for expensive, time consuming and difficult alteration of the hard coded application software. The system can also be used for altering the population/validation rules where a foreign service provider changes the format of their data transfers, or the nature of the data being sent.

We claim:

1. A method comprising:

receiving, by a local network administrator that supports a local cellular telephone network to which a local subscriber is registered, a serialized data stream from a foreign network administrator, wherein the serialized data stream describes a cellular telephone call made by the local subscriber while the local subscriber was roaming in the foreign network system, and wherein the serialized data stream includes a plurality of attributes defined in a format that is negotiated between the foreign network administrator and the local network administrator, wherein the attributes include "Field Type," "Length in Bytes," "Description," and "Buffer Position" for each data item in the serialized data stream;

attaching, by the local network administrator, one or more validation rules and one or more population rules to each of the attributes;

validating each attribute in the serialized data stream as comporting with all of the validation and population rules; and in response to all attributes in the serialized data stream being validated, converting the serialized data stream into a local format for storage by the local network administrator.

2. The method of claim 1, wherein the "Description" includes the local subscriber's name and account number, and wherein the "Buffer Position" describes a buffer position between each attribute when stored by the local network administrator.

3. A machine-readable medium having a plurality of instructions processable by a machine embodied therein, wherein said plurality of instructions, when processed by said machine causes said machine to perform a method comprising:

receiving, by a local network administrator that supports a local cellular telephone network to which a local subscriber is registered, a serialized data stream from a foreign network administrator, wherein the serialized data stream describes a cellular telephone call made by the local subscriber while the local subscriber was roaming in the foreign network system, and wherein the serialized data stream includes a plurality of attributes defined in a format that is negotiated between the foreign network administrator and the local network administrator, wherein the attributes include "Field Type," "Length in Bytes," "Description," and "Buffer Position" for each data item in the serialized data stream;

attaching, by the local network administrator, one or more validation rules and one or more population rules to each, of the attributes;

validation each attribute in the serialized data stream as comporting with all of the validation and population rules; and in response to all attributes in the serialized data stream being validated, converting the serialized data stream into a local format for storage by the local network administrator.

4. The machine-readable medium of claim 3, wherein the "Description" includes the local subscriber's name and account number, and wherein the "Buffer Position" describes a buffer position between each attribute when stored by the local network administrator.

5. A system comprising:

means for receiving, by a local network administrator that supports a local cellular telephone network to which a local subscriber is registered, a serialized data stream from a foreign network administrator, wherein the serialized data stream describes a cellular telephone call made by the local subscriber while the local subscriber was roaming in the foreign network system, and wherein the serialized data stream includes a plurality of attributes defined in a format that is negotiated between the foreign network administrator and the local network administrator, wherein the attributes include "Field Type," "Length in Bytes," "Description," and "Buffer Position" for each data item in the serialized data stream;

means for attaching, by the local network administrator, one or more validation rules and one or more population rules to each of the attributes;

means for validating each attribute in the serialized data stream as comporting with all of the validation and population rules; and means for, in response to all attributes in the serialized data stream being validated, converting the serialized data stream into a local format for storage by the local network administrator.

6. The system of claim 5, wherein the "Description" includes the local subscriber's name and account number, and wherein the "Buffer Position" describes a buffer position between each attribute when stored by the local network administrator.

* * * * *